(12) United States Patent
Zimmermann et al.

(10) Patent No.: US 6,727,844 B1
(45) Date of Patent: Apr. 27, 2004

(54) METHOD AND DEVICE FOR DETECTING OBJECTS

(75) Inventors: Uwe Zimmermann, Ludwigsburg (DE); Achim Pruksch, Neudenau (DE); Werner Uhler, Bruchsal (DE)

(73) Assignee: Robert Bosch GmbH, Stuttgart (DE)

( * ) Notice: Subject to any disclaimer, the term of this patent is extended or adjusted under 35 U.S.C. 154(b) by 156 days.

(21) Appl. No.: 09/687,218

(22) Filed: Oct. 13, 2000

(30) Foreign Application Priority Data

Oct. 13, 1999 (DE) .......................... 199 49 409

(51) Int. Cl.⁷ ............................. G01S 13/93
(52) U.S. Cl. .................... 342/70; 342/59; 342/118; 342/126; 342/128; 342/134; 342/175; 342/195; 701/300; 701/301
(58) Field of Search .................. 342/24, 27, 28, 342/70, 71, 72, 104–118, 126–136, 145, 146, 147, 175, 195, 450, 451, 458, 461, 59; 356/3.13–3.16, 4.01, 3.1, 3.11, 3.12; 701/23, 28, 200, 207, 223, 225, 300, 301

(56) References Cited

U.S. PATENT DOCUMENTS

| | | | | |
|---|---|---|---|---|
| 4,954,962 A | * | 9/1990 | Evans et al. ................. 701/28 |
| 5,040,116 A | * | 8/1991 | Evans et al. ................. 701/28 |
| 6,018,696 A | * | 1/2000 | Matsuoka et al. .......... 701/207 |
| 6,097,476 A | * | 8/2000 | Kato et al. ................. 356/4.01 |
| 6,169,572 B1 | * | 1/2001 | Sogawa ....................... 701/200 |

FOREIGN PATENT DOCUMENTS

JP          4-167008 A    *  6/1992    ............ G05D/1/02

OTHER PUBLICATIONS

Kunert et al., Martin, "Radar–Based Near Distance Sensing Device for Automotive Applications," SAE Paper No. 1999–01–1239, 1999.

* cited by examiner

Primary Examiner—Bernarr E. Gregory
(74) Attorney, Agent, or Firm—Kenyon & Kenyon

(57) ABSTRACT

A method and a device for detecting objects that has at least two near distance sensors installed on a vehicle. The at least two near distance sensors have detection ranges that overlap at least partially. The relative positions of possible detected objects with respect to the at least two near distance sensors are determined in the overlap area by the triangulation principle. Possible apparent objects obtained by determining the relative position of possible detected objects are identified using dynamic object monitoring.

16 Claims, 1 Drawing Sheet

METHOD AND DEVICE FOR DETECTING OBJECTS

FIELD OF THE INVENTION

The present invention relates to a method and a device for detecting objects.

BACKGROUND INFORMATION

A method and a device for detecting objects are used, for example, for pre-crash sensing in a motor vehicle. In this case, a sensor system determines whether a collision with a detected object, for example, another vehicle, may occur. In the case of a collision, it is additionally determined with what speed and at what point of contact the collision will occur. In possession of this information, life-saving milliseconds can be gained for the driver of the vehicle during which preparatory measures, for example, for airbag deployment or for a seatbelt system, can be taken. Other possible applications include parking pilot, blind spot detection, or a stop and go system as an extension of an existing cruise control system (for example ACC, Adaptive Cruise Control).

SAE Paper No. 1999-01-1239 entitled "Radar-based near distance sensing device for automotive application" by Martin Kunert et al., published at the "International Congress & Exposition, March 1999, Detroit" describes a radar-based near distance sensor system. The microwave system described therein operates preferably in the 24 GHz frequency range and has at least two sensors one of which covers the front of the vehicle and the other the complete rear part. On the basis of the synthetic antenna aperture resulting from the distributed radar modules, the horizontal angle is determined by triangulation. Each of the individual radar modules has an antenna beam and a flat modular design. A microcontroller performing a variety of functions and ensuring a connection to the vehicle infrastructure, among other things, is also integrated in the radar module. In order to use the triangulation principle, at least two radar modules are required. Due to the limited bandwidth of the radar modules (poor resolution when detecting a plurality of objects) and in order to avoid ambiguous situations, SAE Paper No. 1999-01-1239 describes a configuration that has three radar modules.

SUMMARY OF THE INVENTION

An object of the present invention is to provide a method and a device requiring less expensive hardware as compared to conventional methods and devices, while providing reliable detection results.

The object is achieved according to the present invention through a method for detecting objects that has at least two near distance sensors installed on a vehicle with detection ranges that overlap at least partially. The relative positions of possible detected objects with respect to the sensors are determined in the overlap area by the triangulation principle. Possible apparent objects obtained by the object determination are identified using dynamic object monitoring.

By achieving the object of the present invention in this manner, a third near distance sensor such as used in conventional methods and devices is no longer necessary, while reliability of the detection results remains unaffected. Although apparent objects are generated using just two near distance sensors in the overlap area of the sensors by the triangulation principle in the method according to the present invention as in conventional methods, these apparent objects can be identified and eliminated if appropriate by dynamic object monitoring. In an arrangement of more than two sensors, the method according to the present invention has the advantage that fewer sensors are required than would be necessary in conventional methods in order to provide unambiguous measurement results.

It is advantageous that at least the speeds, accelerations, and/or changes in acceleration of the possible detected objects are analyzed for dynamic object monitoring. Using the analysis, it can be verified in a particularly advantageous manner whether the analyzed speeds, accelerations, and/or changes in acceleration of the possible detected objects assume values outside a predefined range of values. In other words, it is verified whether the possible detected objects can be actual detection objects due to their dynamic movements or whether these detected objects are apparent objects.

According to one embodiment of the method according to the present invention, the predefined value ranges are determined according to the respective driving situation and/or are extracted from a memory. Thus the limits of speed, acceleration, and change in acceleration that distinguish a real object from an apparent object are adaptively matched to the driving situation. Thus, Apparent objects are reliably recognized in any driving situation in a particularly advantageous manner.

According to an advantageous embodiment of the method according to the present invention, dynamic object monitoring or dynamic object motions taking place mainly across the alignment of the detection area of the sensors are analyzed. This embodiment advantageously takes into account the fact that the apparent objects, for example in the transverse direction, exhibit unplausible values of speed, acceleration, and change in acceleration.

The object of the present invention also is achieved by a device for detecting objects that includes at least two near distance sensors installed on a vehicle, whose detection ranges overlap at least partially. The device also includes means to determine relative positions of possible detected objects with respect to the sensors in the overlap area by the triangulation principle, and means to identify possible apparent objects obtained by the object determination using dynamic object monitoring. By using means according to the present invention for identifying apparent objects through dynamic object monitoring it is possible in an advantageous manner to implement an object detection system using only two near distance sensors, as well as to achieve a particularly high degree of detection reliability.

The sensors are, for example, pulse radar sensors in the 24 GHz range and are arranged uniformly spaced on the front of the vehicle. The detection range of the sensors is, for example, at least seven meters and the detection angle is, for example, at least 140°. Through this arrangement of the device according to the present invention, a particularly inexpensive and reliable system is provided that can also be used for different applications. The data delivered using the device according to the present invention can be used at the same time for pre-crash monitoring, for example, while supporting the stop and go function of an adaptive cruise control system (ACC). With respect to the last-named application together with ACC, but also in any other application, it is advantageous if at least one additional sensor system that has a different detection range is also present.

DETAILED DESCRIPTION

Figure 1:
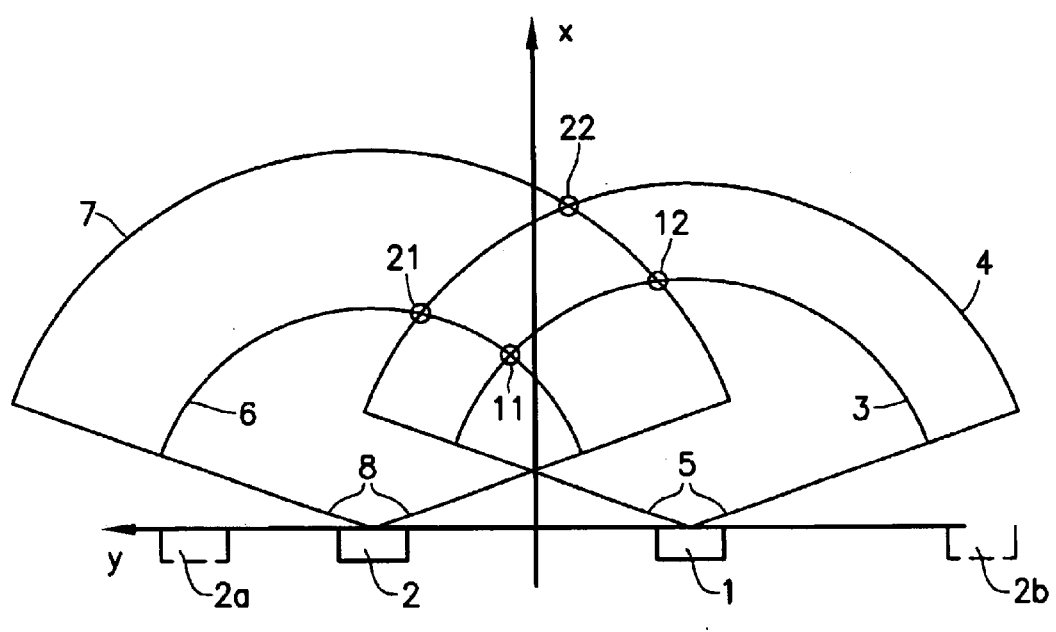
FIG. 1 shows a first detection image of two sensors.

FIG. 1 shows a first detection image of two near distance sensors 1 and 2. The exemplary use of the near distance sensors described in this patent application is the detection of objects from a motor vehicle. For this purpose, the near distance sensors are usually installed visibly or invisibly on the outer perimeter of the vehicle. One possible location of installation is, for example, the front bumper of the vehicle. This location of installation is usually selected in those cases where mainly the area in front of the vehicle in the direction of travel is to be detected or monitored. With respect to FIG. 1, the Y axis therefore approximately corresponds to the surface of the front bumper of a vehicle. The X axis in this case designates the direction of travel, i.e., the longitudinal axis of the vehicle in FIG. 1. The symmetrical arrangement of sensors 1 and 2 with respect to the X axis shown in this embodiment by no means represents a limitation of the invention. The near distance sensors may have an asymmetric arrangement on a vehicle, and a larger number of sensors 2a, 2b may also be installed. The only condition to be observed here is that the distance between the sensors when installed be known so that the distances to the detection objects can be determined by the triangulation principle. For applications requiring a symmetrical detection area with respect to the longitudinal axis of the vehicle, a symmetrical arrangement of the sensors is advantageous.

In any case, evaluation by the triangulation principle is only possible within the overlap area of the sensors. In the case of a single object to be detected, a position is unambiguously determined. However, if several objects are located within the detection area or within the overlap area, the results obtained by triangulation are ambiguous. The following figure description shows how this ambiguity can be resolved unambiguously without using additional hardware.

FIG. 1 shows two radii 3 and 4 around the location of installation of sensor 1, and radii 3 and 4 identify possible detection distances of sensor 1. FIG. 1 also shows the maximum detection angle 5 of sensor 1. The near distance sensors used in this embodiment have, for example, a detection angle of approximately 140° and a maximum detection range of approximately 7 m. The distance shown in the embodiment between sensors 1 and 2 on the Y axis should be approximately 1.2 m, for example. Thus, an overlap area of approximately 7 m in the X direction and of approximately 5 m in the Y direction is is obtained using the sensor arrangement shown in the embodiment.

It should be noted that the orders of magnitude referred to in this embodiment represent no limitation to the invention. Depending on the configuration of the sensor system, any detection or overlap ranges belong to the method according to the present invention or the device according to the present invention.

Assume that sensor 2 also detects objects at two different distances. FIG. 1 shows these detection radii 6 and 7 of sensor 2, and the maximum detection angle 8 of sensor 2, which in this example should also be 140°. If all points of intersection of the detection radii of sensors 1 and 2 are formed in a purely formal manner, the possible object positions 11, 12, 21 and 22 are obtained. Assume that reflex positions 11 and 22 represent the positions of the actual object present. Due to the fact that sensors 1 and 2 are only distance sensors, rather than angle sensors and the positions of possible objects are formed through the points of intersection of the detection radii, the non-real apparent reflexes 12 and 21 are obtained at the points of intersection of the detection radii of sensors 1 and 2. It is now possible, according to the present invention, to identify, using dynamic object monitoring, the apparent objects generated by object detection and therefore to ignore them in the subsequent analysis. Reference is made to the following FIG. 2 for explanation.

Figure 2:
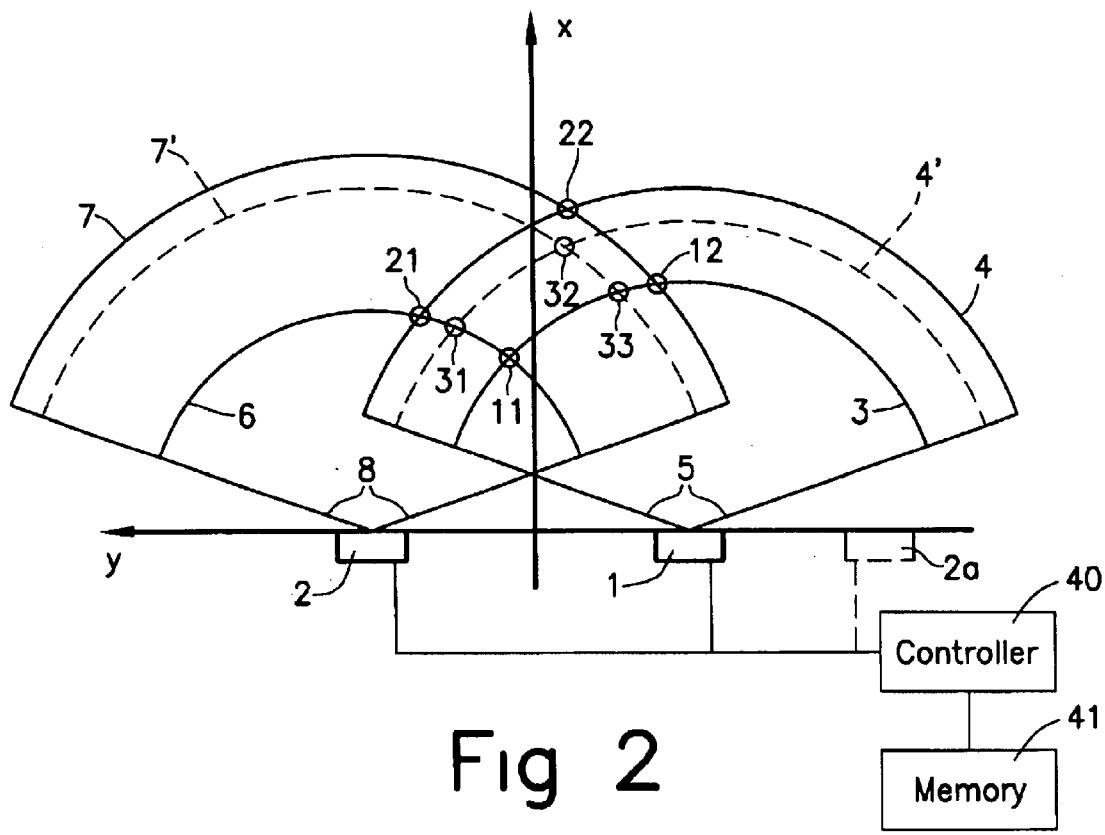
FIG. 2 shows a second detection image of two sensors.

FIG. 2 shows the identical arrangement of the two near distance sensors 1 and 2 as shown in FIG. 1 and described above. Assume that detection radii 3, 4, 6, and 7 as shown in FIG. 1 were detected at time t0. Thus, at time t0 the possible object positions 11, 12, 22, and 21 result. If it is now assumed that object 11 is at rest with respect to the sensor system, detection radii 3 and 6 remain unchanged at subsequent points in time. Such an object at relative rest may be a motorcycle traveling ahead and very close at a constant distance. Furthermore, assume that object 22 moves with respect to the own vehicle in the negative direction of the X axis shown. This would mean that real object 22 is in position 32 at time t1. This position 32 would be detected by sensor 1 at distance 4' and by sensor 2 at distance 7'. Due to the fact that object 11 is at rest with respect to the vehicle, i.e., to the sensor system, object 11 continues to be detected at distances 3 and 6 from the sensors. The new apparent reflex positions 31 and 33 are obtained through the detected distances 4' and 7' in combination with detected distances 3 and 6, apparent reflex position 31 corresponding to previous apparent reflex position 21 and apparent reflex position 33 corresponding to previous apparent reflex position 12. This assignment of the objects to one another at different points in time is performed by a procedure known as tracking, which is known to those skilled in the art. The object positions are stored in a memory 41 at different points in time and assigned to one another using appropriate algorithms, so that a kind of detection track is obtained for individual detected objects. In addition to assigning the detected object data to a certain object, the dynamics of the individual objects can be analyzed using the stored data. This means primarily that the speed, the acceleration, and/or the change in acceleration is analyzed or determined for each individual possible detected object. Then, the values obtained of speed, acceleration, and change in acceleration are checked for plausibility. For this purpose certain model limits corresponding to the physical limit conditions of the real object can be simulated in a controller 40 that has an integrated microcontroller. Thus, for example, it is known that a vehicle traveling ahead and changing lanes has a speed across the direction of travel of our own vehicle of the order of magnitude of approximately 2 m/s, for example. In the special case of the analysis of the dynamics of the detected objects, this means that, if a possible reflex position has a speed in the Y direction which exceeds a dynamic limit of 5 m/s, for example, this is an apparent object. In particular, a high speed in the Y direction is characteristic of an apparent object. This is also illustrated by the example shown in FIG. 2. While the real object has hardly moved from position 22 at time t0 to position 32 at time t1 in the Y direction and therefore also has a low speed in the Y direction, apparent object reflexes 12 and 21 (at time t0) that have apparent object reflexes 31 and 33 (at time t1) have two positions that have a clear offset in the Y direction with respect to the positions at time t0. Thus, these apparent object reflexes have a high speed in the Y direction that is higher than a dynamic limit of 5 m/s, for example. Therefore, apparent object reflexes 31 and 33 can be unambiguously determined. Similarly, dynamic limits for acceleration or change in acceleration can be set. The apparent object reflexes thus determined can be correspondingly taken into account in the subsequent analysis. Thus, apparent objects represent no real danger for the pre-crash sensor system, for example.

In general, a possible detected object is then an apparent reflex if the object is outside the predefined dynamic limits. An analysis of the dynamic object motions taking place primarily across the alignment of the sensors is performed here, for example. This is particularly advantageous because, as shown with reference to FIG. 2, apparent reflexes have a high speed in the transverse direction (to the direction of travel of the vehicle, i.e., to the longitudinal axis of the vehicle). In general, using any dynamic value of the detected possible objects that can be analyzed for determining the apparent reflexes is within the scope of the device and the method according to the present invention.

According to an advantageous embodiment, the predetermined value ranges, i.e., dynamic limits, can be adapted to the respective driving situation of the vehicle. In this case, an appropriate data set can be extracted from a memory 41 according to the forward speed of the vehicle or the type of road (city, rural road, or highway) or the amount of traffic, in order to form a suitably adapted dynamic model. The value ranges, i.e., the dynamic limits, can also be adaptively calculated from values such as the vehicle's speed, traffic conditions, type of road, and weather conditions. Finally, the calculation can be performed as a function of any available signals, for example, signals available on the on-board bus system (for example, CAN bus).

An embodiment of a method of determining the apparent reflexes is described below. Initially the possible detection objects are arbitrarily assigned to certain reflexes using the priority of the reflexes with the smallest radial distance from the sensor system as an assignment criterion, for example. In the configuration shown in FIG. 2, reflex positions 11 and 21 are the closest reflexes at time t0. In the case of more than one "closest reflex," an arbitrary reflex point is selected according to the present invention. Assume that initially the particular reflex position 21 is the real position of an object. On the basis of this assumption, reflexes 11 and 22 are apparent reflexes, because they are located on distance radii 4 and 6 and these distance radii have already been used for determining reflex position 21. Furthermore, reflex 12 is assumed to be an actual object reflex, since detection radii 3 and 7 have not yet been used to form a point of intersection. According to the method described above, after determining the possible object positions at time t1, reflexes 31 and 33 can be determined as apparent reflexes, since their speeds in the Y direction, as described above, are outside the dynamic limits for a real object. Reflex 22, previously assumed to be an apparent reflex, is, however, revised at time t1 as an actual object position like reflex position 11, which was previously assumed to be an apparent reflex. If reflex positions 11 and 22 move within the dynamic limits also during the subsequent time segments, the situation of the type corresponding to the real arrangement is obtained. In general, all possible reflex positions are successively checked for possibly exceeding the dynamic or model limits in each time segment. The order of verification of the individual object positions is set, for example, using relevance, i.e., whether they have been previously determined as real object positions, or using the radial distances of the previous measurement cycle. In the general case, verification of the individual possible reflex positions can also be performed in the order in which they are stored in the tracking list in the memory 41.

The near distance sensors described in this embodiment are designed, for example, as 24 GHz pulse radar devices and integrated in the bumper of the vehicle. An embodiment of the device according to the present invention and performance of the method according to the present invention are, of course, also possible using other near distance sensors. These may be, for example, laser-based sensors, acoustic sensors or sensors based on thermal measurements. The important thing in each case is that these sensors have a good resolution for a plurality of detected objects. The sensor system described for this embodiment is capable of detecting, i.e., differentiating between, objects having a lateral distance or offset of approximately 3–40 cm with respect to one another. It is also possible to arrange the sensors not only at the front of the vehicle. In general the sensors may be arranged anywhere around the vehicle. The arrangement described in this embodiment at the front of the vehicle is primarily suitable as a pre-crash sensor system or, in combination with a cruise control device (for example, ACC, Adaptive Cruise Control), for stop and go operation. As a possible parking pilot or blind spot detection devices, the sensors must be arranged, of course, also in other positions around the car.

The sensor arrangement used in the practical embodiment has, for example, a distance resolution of approximately 3 cm and an angular resolution of approximately 3°. A measurement cycle has a duration of approximately 1 to 2 ms, for example. After 20 ms at the latest, in the method and the device according to the present invention, a possible reflex position of a detected object is detected so often that it can be reliably determined whether there will be a contact with the object and whether the object actually exists. It is also possible to determine at which point and at what speed the contact with the vehicle will occur. Knowing at which point and at what speed a crash with the detected object will occur, preparatory measures in the airbag controller or in the seat belt system can be taken. In general, the pre-crash information obtained is used for all vehicle safety systems. These may include automatic emergency call systems or interruption of the fuel supply or automatic emergency breaking, for example.

The near distance sensors used in this embodiment have a range of approximately 7 m, for example. Depending on the application, sensors with greater ranges, for example, up to 20 m, can obviously also be used. Particularly advantageous is the combination of the sensor system according to the present invention with an additional sensor system 2a that has a different detection range. The combination with an FMCW radar for adaptive cruise control (ACC) that has a range of up to 200 m is possible. Other possible applications are also within the scope of the method and the device according to the present invention, such as blind spot detection, parking pilot, passive entry function (keyless go) and pre-crash detection.

What is claimed is:
1. A method of detecting objects, comprising the steps of:
determining relative positions of possible detected objects in an at least partially overlapping area of detection ranges of at least two distance sensors using triangulation, the at least two distance sensors being installed on a vehicle;
monitoring dynamic properties of the possible detected objects; and
analyzing the dynamic properties of the possible detected objects to identify at least one of the possible detected objects as an actual object.

2. The method according to claim 1, wherein the step of monitoring the dynamic properties of the possible detected objects includes monitoring at least one of the following dynamic property values:

monitoring speeds of the possible detected objects, monitoring accelerations of the possible detected objects; and monitoring changes in acceleration of the possible detected objects.

3. The method according to claim 2, further comprising the step of:

identifying at least one of the possible detected objects as an apparent object when at least one of the dynamic property values is outside a predefined value range.

4. The method according to claim 3, further comprising the step of:

at least one of:

determining the predefined value range as a function of at least one of a respective driving situation of the vehicle; and retrieving the predefined value range from a memory.

5. The method according to claim 1, further comprising the step of:

analyzing the dynamic properties of the possible detected objects that occur substantially across an alignment of the at least two distance sensors.

6. The method according to claim 1, wherein the at least two distance sensors have a range of approximately seven meters.

7. The method according to claim 1, wherein the at least two distance sensors have a range of twenty meters or less.

8. The method according to claim 1, wherein the at least two distance sensors have a range of two hundred meters or less.

9. A device for detecting objects, comprising:

at least two distance sensors installed on a vehicle, the at least two distance sensors having detection ranges, the detections ranges at least partially overlapping;

a first arrangement configured to determine relative positions of possible detected objects with respect to the at least two distance sensors in the at least partially overlapping area of the detection ranges using triangulation; and a second arrangement configured to identify apparent objects by monitoring and analyzing dynamic properties of the possible detected objects.

10. The device according to claim 9, wherein:

the at least two distance sensors are pulse radar sensors in the 24 GHz range.

11. The device according to claim 9, wherein:

the at least two distance sensors are uniformly spaced on a front of the vehicle.

12. The device according to claim 9, wherein:

the at least two distance sensors have a detection angle of at least 140°.

13. The device according to claim 9, further comprising:

at least one additional sensor system having a different detection range than the at least two distance sensors.

14. The device according to claim 9, wherein the at least two distance sensors have a range of approximately seven meters.

15. The device according to claim 9, wherein the at least two distance sensors have a range of twenty meters or less.

16. The device according to claim 9, wherein the at least two distance sensors have a range of two hundred meters or less.

\* \* \* \* \*

UNITED STATES PATENT AND TRADEMARK OFFICE
CERTIFICATE OF CORRECTION

PATENT NO. : 6,727,844 B1
DATED : April 27, 2004
INVENTOR(S) : Uwe Zimmermann et al.

It is certified that error appears in the above-identified patent and that said Letters Patent is hereby corrected as shown below:

<u>Column 6,</u>
Line 13, change "approximately 3-40 cm" to -- approximately 30-40 cm --

Signed and Sealed this

Eighth Day of February, 2005

JON W. DUDAS
*Director of the United States Patent and Trademark Office*